P. G. EKSTRÖM.
MANUFACTURING ALCOHOL FROM SULFITE LIQUOR.
APPLICATION FILED FEB. 24, 1912.
1,050,723.
Patented Jan. 14, 1913.
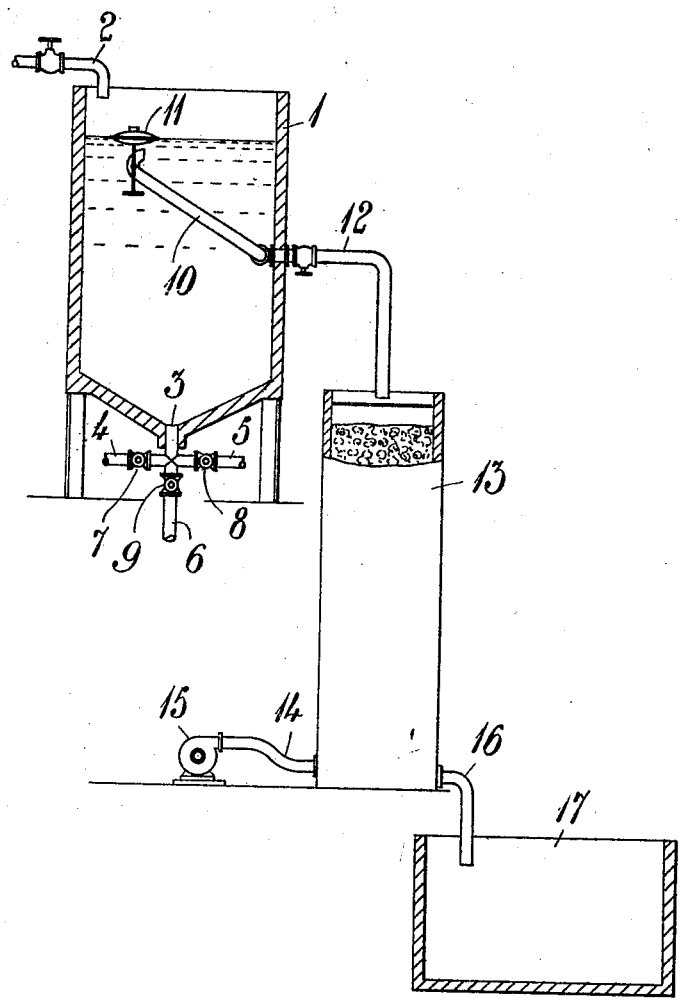
Witnesses:
B. Dommers
E. Leckert.
Inventor.
Per Gösta Ekström
By Henry Orth Jr.
Atty

UNITED STATES PATENT OFFICE.

PER GÖSTA EKSTRÖM, OF HARNÄS, SWEDEN, ASSIGNOR TO AKTIEBOLAGET ETHYL, OF FALUN, SWEDEN.

MANUFACTURING ALCOHOL FROM SULFITE LIQUOR.

1,050,723.

Specification of Letters Patent.   Patented Jan. 14, 1913.

Application filed February 24, 1912. Serial No. 679,795.

*To all whom it may concern:*

Be it known that I, PER GÖSTA EKSTRÖM, a citizen of the Kingdom of Sweden, residing at Harnäs, Sweden, have invented new and useful Improvements in the Process of Manufacturing Alcohol by Fermenting the Saccharine Matters of the Sulfite Liquor from Sulfite Pulp, of which the following is a specification.

In the process of manufacturing alcohol by fermenting the saccharine matters of the sulfite liquor from sulfite pulp, it is difficult to maintain a quantity of free oxygen sufficient for the development of the yeast due to the fact that the liquor contains reducing compounds, or compounds which are easily oxidized during the fermentation, that rapidly consume the free oxygen that may be supplied by usual aeration.

The present invention is an improvement on the process described and claimed in my co-pending application Serial No. 679,792, filed even date herewith and has for its object to avoid the above named difficulty.

The invention consists chiefly, in adding to the liquor before fermenting the same, a catalyzer for oxidation and then aerating the liquor. The catalyzer effects a rapid oxidation of those compounds which later on during the fermentation process would be capable of consuming the free oxygen in the liquor and thereby render said compounds uninjurious to the fermentation.

Inasmuch as the sulfite liquor drawn from the boilers generally has a temperature of nearly 100° C. at which the liquor cannot mechanically absorb the quantity of oxygen required for the fermentation, it is preferable after the addition of the catalyzer to accomplish the aeration in two steps, viz. first at the temperature 90 to 95° C., which the liquor has when drawn off from the boiler, whereby the catalyzer and the aeration cause a rapid and effective oxidation of those compounds of the liquor that are easily oxidized, and then at a lower temperature, for instance 25 to 35° C., whereby chiefly, the quantity of oxygen required for the fermentation is absorbed mechanically by the liquor.

As catalyzer may be used any substance that in solution is capable of transferring oxygen, for instance, salts of manganese, chromium and cobalt. I have reached good results in using sulfate of manganese.

The invention will be more particularly described with reference to the accompanying drawing which shows diagrammatically an apparatus for carrying the invention into practice.

Inasmuch as the preparatory treatment of the liquor comprises the neutralization of the same by means of a base, for instance lime, whereby oxidizable compounds are formed, said neutralization will be described, though it does not form *per se* any part of the present invention.

In the drawing 1, indicates a receptacle for neutralizing the liquor, in which also the catalyzer is added to the liquor and the first aeration is accomplished. The receptacle 1 is provided at its top with a supply pipe 2 for the liquor to be treated and has at its bottom a nozzle 3 to which are connected three pipes, 4, 5 and 6 each provided with a cock or valve 7, 8, and 9 respectively. The pipe 4 is a supply pipe for compressed air, 5 is a supply pipe for water used for flushing away sediments from the bottom of the receptacle, and 6 an outlet pipe for the flush water.

10 indicates a pivoted siphon pipe which is supported by a float 11 and through which the liquor can be drawn off from the receptacle. The siphon pipe 10 is, outside the receptacle 1, connected to a pipe 12 leading to the top of one or more towers or similar apparatus 13, only one tower being shown in the drawing. The tower 13 is filled with pieces of suitable material, for instance stone, between which the liquor can flow down divided in fine currents. At the bottom, the tower 13 is provided with a supply pipe 14 for air which may be supplied by means of a fan 15 or the like and flows up through the tower in opposite direction to the liquor and escapes at the top of the tower. If necessary a cooling apparatus may be provided between the receptacle 1 and the tower 13 for cooling the liquor before the latter reaches the tower. Generally the necessary cooling of the liquor may however, be effected by the air flowing through the tower and serving to aerate the liquor. At the bottom the tower is provided with an outlet 16 through which the liquor may be led directly to reservoirs 17 for fermentation. Only one reservoir 17 is shown in the drawing.

The invention is carried into practice by means of the apparatus described in the following manner: The sulfite liquor drawn off from the boiler is admitted to the receptacle 1 through the pipe 2 at a temperature that should be as nearly to the boiling point as possible, for instance 90 to 95° C., and at the same time a catalyzer for oxidation, for instance sulfate of manganese, is added to the liquor. If sulfate of manganese be used, a quantity thereof of 100 gr. may be taken for each cubic meter of liquor. If it is desired at the same time to neutralize the liquor, a suitable quantity of a neutralizing agent, for instance lime mud or powdered lime-stone, is added. Thereupon the cock 7 is opened, so that compressed air flows from the pipe 4 through the nozzle 3 into the liquor in the receptacle 1. The air effects a violent stirring of the liquor and by the action of the catalyzer a rapid oxidation of the easy oxidizable compounds that are contained in the liquor is formed in the neutralizing process. If the quantity of liquor treated is 100 to 200 cubic meters the neutralizing and oxidizing processes generally are finished after a period of about three hours. For the action of the catalyzer, it is of no importance if the neutralization is accomplished at the same time as the treatment by means of catalyzer or before or after said treatment. The neutralizing agent employed coacts, with the catalyzer and aeration in such a manner that it neutralizes acids or acid compounds which are formed or released in the liquor by the oxidation taking place in the aeration and which must be made uninjurious before the liquor can be fermented. When the treatment in the receptacle 1 has been finished, the liquor is left in the receptacle 1 until the solid matters contained therein have been deposited, and it is then drawn off through the siphon 10 and the pipe 12 to the tower 13 for being subjected to a second aeration while flowing down through the tower in fine currents at the same time air is blown through the tower in opposite direction. The second aeration should be carried out at a temperature of 25 to 35° C. and during the same a mechanical absorption of oxygen from the air takes place. If necessary the liquor may pass a cooling apparatus, (not shown in the drawing) before it is supplied to the towers 13 for cooling it to the desired temperature. Generally the cooling may, however, be accomplished in the towers 13 by means of the air used for the second aeration. After aeration in one or more towers 13 or similar apparatus the liquor is ready to be fermented and may be drawn off directly to the fermentation reservoirs 17.

The invention is not limited to the use of the apparatus shown in the drawing. For instance, the second aeration may be carried out in a receptacle of the same construction as the receptacle 1. If the liquor has been cooled previously to such a temperature that it can absorb oxygen mechanically, the aeration may be accomplished in one step. Eventually the second aeration may be carried out in the fermentation reservoirs, while the fermenting process is going on, as is customary in fermenting other saccharine liquids.

I claim:

1. The method of treating the sulfite liquor from the sulfite pulp as a preparatory step to the manufacture of alcohol by fermenting the saccharine matters contained therein, which consists in adding a catalyzer for oxidation to the liquor before the fermentation process is carried out, and aerating the liquor, substantially as and for the purpose set forth.

2. Method of treating the sulfite liquor from sulfite pulp as a preparatory step to the manufacture of alcohol by fermenting the saccharine matters contained therein, which consists in adding a catalyzer for oxidation and a base to the liquor before the fermentation process is carried out, and aerating the liquor, substantially as and for the purpose set forth.

3. Method of treating the sulfite liquor from sulfite pulp as a preparatory step to the manufacture of alcohol by fermenting the saccharine matters contained therein, which consists in adding a catalyzer for oxidation, aerating the liquor while in a hot state, cooling the liquor and again aerating the same, substantially as and for the purpose set forth.

4. Method of treating the sulfite liquor from sulfite pulp as a preparatory step to the manufacture of alcohol by fermenting the saccharine matters contained therein which consists in adding a catalyzer for oxidation and a base to the liquor, aerating the liquor while in a hot state, separating the liquor from the solid matters contained therein, cooling the liquor, and again aerating the same, substantially as and for the purpose set forth.

In testimony that I claim the foregoing as my invention, I have signed my name in presence of two subscribing witnesses.

PER GÖSTA EKSTRÖM.

Witnesses:
CARL DELMAR,
JOHN DELMAR.

Copies of this patent may be obtained for five cents each, by addressing the "Commissioner of Patents, Washington, D. C."